(12) United States Patent
Burns et al.

(10) Patent No.: US 9,712,490 B1
(45) Date of Patent: *Jul. 18, 2017

(54) IDENTIFYING APPLICATIONS FOR INTRUSION DETECTION SYSTEMS

(71) Applicant: Juniper Networks, Inc., Sunnyvale, CA (US)

(72) Inventors: Bryan Burns, Portland, OR (US); Siying Yang, Burlingame, CA (US); Julien Sobrier, Campbell, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/651,875

(22) Filed: Oct. 15, 2012

Related U.S. Application Data

(63) Continuation of application No. 11/835,923, filed on Aug. 8, 2007, now Pat. No. 8,291,495.

(51) Int. Cl.
*G06F 11/00* (2006.01)
*H04L 29/06* (2006.01)

(52) U.S. Cl.
CPC ...... *H04L 63/0254* (2013.01); *H04L 63/1441* (2013.01); *H04L 63/168* (2013.01)

(58) Field of Classification Search
CPC ..... G06F 21/55; G06F 21/50; H04L 63/1408; H04L 63/14
USPC .................. 726/26, 22–25; 713/155; 709/224
See application file for complete search history.

(56) References Cited

U.S. PATENT DOCUMENTS

| | | | |
|---|---|---|---|
| 5,598,535 A | 1/1997 | Brech et al. | |
| 5,884,025 A | 3/1999 | Baehr et al. | |
| 5,960,452 A | 9/1999 | Chi | |
| 6,147,976 A | 11/2000 | Shand et al. | |
| 6,438,723 B1 | 8/2002 | Kalliojarvi | |
| 6,697,381 B1 | 2/2004 | Talbot et al. | |

(Continued)

FOREIGN PATENT DOCUMENTS

CN      101056306      10/2007

OTHER PUBLICATIONS

U.S. Appl. No. 12/261,512, filed Oct. 30, 2008, entitled, Dynamic Access Control Policy With Port Restrictions for a Network Security Appliance.

(Continued)

*Primary Examiner* — Dede Zecher
*Assistant Examiner* — Viral Lakhia
(74) *Attorney, Agent, or Firm* — Shumaker & Sieffert, P.A.

(57) ABSTRACT

An intrusion detection system ("IDS") device is described that includes a flow analysis module to receive a first packet flow from a client and to receive a second packet flow from a server. The IDS includes a forwarding component to send the first packet flow to the server and the second packet flow to the client and a stateful inspection engine to apply one or more sets of patterns to the first packet flow to determine whether the first packet flow represents a network attack. The IDS also includes an application identification module to perform an initial identification of a type of software application and communication protocol associated with the first packet flow and to reevaluate the identification of the type of software application and protocol according to the second packet flow. The IDS may help eliminate false positive and false negative attack identifications.

24 Claims, 7 Drawing Sheets

(56) References Cited

U.S. PATENT DOCUMENTS

| | | | |
|---|---|---|---|
| 6,826,694 B1 | 11/2004 | Dutta et al. | |
| 6,854,063 B1 | 2/2005 | Qu et al. | |
| 6,940,863 B2 | 9/2005 | Xue et al. | |
| 6,963,564 B1 | 11/2005 | Liu | |
| 6,973,055 B1 | 12/2005 | Du | |
| 7,272,646 B2* | 9/2007 | Cooper et al. | 709/223 |
| 7,337,214 B2* | 2/2008 | Douglass et al. | 709/214 |
| 7,383,438 B2* | 6/2008 | Fahrny et al. | 713/169 |
| 7,454,792 B2 | 11/2008 | Cantrell et al. | |
| 7,463,590 B2 | 12/2008 | Mualem et al. | |
| 7,467,202 B2 | 12/2008 | Savchuk | |
| 7,496,962 B2 | 2/2009 | Roelker et al. | |
| 7,624,444 B2 | 11/2009 | Gupta et al. | |
| 7,725,558 B2 | 5/2010 | Dickenson | |
| 7,730,110 B2* | 6/2010 | DeAnna | G06F 9/465 707/803 |
| 7,747,874 B2 | 6/2010 | Goodwill et al. | |
| 7,830,864 B2 | 11/2010 | Li | |
| 7,844,700 B2 | 11/2010 | Marinescu et al. | |
| 7,890,612 B2 | 2/2011 | Todd et al. | |
| 7,933,410 B2* | 4/2011 | Fahrny | H04N 21/26606 380/201 |
| 7,945,948 B2* | 5/2011 | Ueda | G06F 21/31 380/54 |
| 7,950,059 B2 | 5/2011 | Aharon et al. | |
| 7,995,584 B2 | 8/2011 | Eswaran et al. | |
| 8,042,182 B2* | 10/2011 | Milani Comparetti et al. | 726/23 |
| 8,112,800 B1 | 2/2012 | Yang et al. | |
| 8,166,554 B2* | 4/2012 | John | 726/26 |
| 8,228,926 B2 | 7/2012 | Miller et al. | |
| 8,397,284 B2* | 3/2013 | Kommareddy et al. | 726/13 |
| 8,443,442 B2* | 5/2013 | Wang et al. | 726/23 |
| 8,875,264 B2* | 10/2014 | Tamai | G06F 21/36 713/168 |
| 9,374,662 B2* | 6/2016 | Siomina | G01S 5/0205 |
| 2002/0103953 A1 | 8/2002 | Das et al. | |
| 2002/0144156 A1 | 10/2002 | Copeland, III | |
| 2003/0105976 A1* | 6/2003 | Copeland, III | 713/201 |
| 2003/0140140 A1* | 7/2003 | Lahtinen | 709/224 |
| 2003/0149888 A1* | 8/2003 | Yadav | 713/200 |
| 2003/0154399 A1 | 8/2003 | Zuk et al. | |
| 2004/0151206 A1* | 8/2004 | Scholte | 370/473 |
| 2004/0205360 A1 | 10/2004 | Norton et al. | |
| 2004/0268149 A1 | 12/2004 | Aaron | |
| 2005/0055399 A1 | 3/2005 | Savchuk | |
| 2005/0243789 A1 | 11/2005 | Dinello et al. | |
| 2005/0262560 A1 | 11/2005 | Gassoway | |
| 2006/0101511 A1 | 5/2006 | Faillenot et al. | |
| 2006/0114832 A1 | 6/2006 | Hamilton et al. | |
| 2006/0123479 A1 | 6/2006 | Kumar et al. | |
| 2006/0167915 A1 | 7/2006 | Furlong et al. | |
| 2006/0168273 A1 | 7/2006 | Michael | |
| 2006/0174337 A1 | 8/2006 | Bernoth | |
| 2006/0259950 A1 | 11/2006 | Mattsson | |
| 2006/0268932 A1 | 11/2006 | Singh et al. | |
| 2006/0288418 A1 | 12/2006 | Yang | |
| 2007/0005801 A1 | 1/2007 | Kumar et al. | |
| 2007/0067445 A1* | 3/2007 | Vugenfirer et al. | 709/224 |
| 2007/0171827 A1* | 7/2007 | Scott et al. | 370/235 |
| 2007/0192863 A1* | 8/2007 | Kapoor et al. | 726/23 |
| 2007/0230445 A1 | 10/2007 | Barrie et al. | |
| 2008/0133518 A1* | 6/2008 | Kapoor et al. | 707/6 |
| 2009/0141729 A1 | 6/2009 | Fan | |
| 2010/0085975 A1 | 4/2010 | Wang et al. | |
| 2010/0095367 A1* | 4/2010 | Narayanaswamy | 726/12 |

OTHER PUBLICATIONS

U.S. Appl. No. 12/409,634, filed Mar. 24, 2009, entitled Applying Fine-Grain Policy Action to Encapsulated Network Attacks.

U.S. Appl. No. 13/367,183, filed Feb. 6, 2012, entitled Multilayered Application Classification and Decoding.

Andrew Moore, "Internet traffic Classification using bayesian analysis techniques," Jun. 2005, ACM DL, vol. 33, Issue 1, pp. 53-60.

Dreger et al., "Dynamic application-layer protocol analysis for network intrusion detection," Proceedings of the Usenix Security Symposium, Jul. 31, 2006 pp. 257-272.

\* cited by examiner

IDENTIFYING APPLICATIONS FOR INTRUSION DETECTION SYSTEMS

This application is a continuation of U.S. application Ser. No. 11/835,923, filed Aug. 8, 2007, which is hereby incorporated by reference in its entirety.

TECHNICAL FIELD

The invention relates to computer networks and, more particularly, to detection and prevention of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting network attacks use pattern matching. In particular, an intrusion detection system ("IDS") applies regular expressions or sub-string matches to detect defined patterns within a data stream. Multiple patterns may be used in an attempt to improve the accuracy of the attack detection. In order to improve the probability of detecting an attack, the IDS may attempt to identify the type of software application and protocol associated with the data stream. Based on the identification, the IDS selects the appropriate patterns to apply in order to detect a network attack, which is used herein to include viruses or other malicious activity.

Conventionally, many IDSs associate applications with a static port assignment and used these static port assignments to determine the type of application and protocol associated with a given data stream. However, many hackers or other malicious individuals utilize software application that employ dynamic or randomized port assignments rather than conform to the static port assignments in order to evade detection and containment. Such techniques render it difficult for IDSs to correctly identify the type of application and protocol.

SUMMARY

In general, the invention is directed to techniques for detecting and preventing network attacks, such as Denial of Service Attacks ("DOS") attacks, network viruses or other malicious activity. More specifically, improved techniques are described herein for identifying the software application and protocol associated with a data stream processed by an intrusion detection system ("IDS"). For example, as described herein, an IDS may analyze both client-to-server and server-to-client packet flows in order to improve the accuracy of the identification. Upon first receiving a first packet flow, for example, a connection request from a client device, the IDS may make an initial assessment as to the type of software application and protocol for the incoming data stream. Upon receiving a response, for example, from a server, the IDS may then attempt to confirm the initial assessment of the application and protocol. If the initial assessment was incorrect, then the IDS may dynamically reclassify the application and protocol associated with the data stream. The IDS may then apply the proper pattern to the data stream based on the reclassification.

In addition, in the event that the IDS reclassifies the data stream as a different application and protocol than initially determined, the IDS may apply the newly selected pattern to packet flows previously received as part of the data stream. Accordingly, the IDS may provide more accurate and more secure attack detection and prevention.

The IDS may identify the type of application and communication protocol using several methods. For example, the IDS may select a highest-ordered element from a hierarchically ordered list of applications which corresponds to properties of the client-to-server packet flow. The IDS may select the next-highest-ordered element from the list when properties of the server-to-client packet flow do not match the highest-ordered element. The IDS may also rely on a static mapping to identify a default type of application and protocol. The IDS may reassemble transmission control protocol ("TCP") data from the packet flows and analyze the TCP data to identify the type of application. The IDS may also perform detailed analysis such as, for example, using function pointers to identify specific fields of packets in the packet flows or determining a minimum data size to assist in determining the type of application and protocol. Although described primarily with respect to an intrusion detection system, the techniques described herein may also be directed to an intrusion prevention system ("IPS").

In one embodiment, the invention is directed to a method comprising receiving, with a network device, a first packet flow within a network from a client to a server, performing an initial identification of a type of software application and communication protocol associated with the first packet flow, applying a first set of patterns to the first packet flow to determine whether the first packet flow represents a network attack, and forwarding the first packet flow to a server. The method further comprises receiving, in response, a second packet flow from the server, associating the first packet flow and the second packet flow as a communication session between the client and the server using the first packet flow and the second packet flow, reevaluating the initial identification of the type of software application and protocol associated with the communication session, selecting a second set of patterns based on the reevaluation of the initial identification of the software application and protocol, and applying the second set of patterns to the first packet flow to re-determine whether the first packet flow represents a network attack.

In another embodiment, the invention is directed to an intrusion detection system ("IDS") device comprising a flow analysis module to receive a first packet flow from a client and a second packet flow from a server in response to the first packet flow, a forwarding component to send the first packet flow to the server and the second packet flow to the client, and a stateful inspection engine to apply one or more sets of patterns to the first packet flow to determine whether the first packet flow represents a network attack. The IDS further comprises an application identification module to perform an initial identification of a type of software application and communication protocol associated with the first packet flow, and to reevaluate the identification of the type of software application and protocol according to the second packet flow.

In another embodiment, the invention is directed to a computer-readable medium containing instructions. The computer-readable medium may be a computer-readable storage medium. The instructions cause a programmable processor to receive a first packet flow within a network from a client to a server, perform an initial identification of a type of software application and communication protocol associated with the first packet flow using a hierarchically ordered list of applications and protocols and a static port mapping apply a first set of patterns to the first packet flow to determine whether the first packet flow represents a network attack, store the first packet flow in a data buffer, and forward the first packet flow to a server. The instructions further cause the processor to receive, in response to the first packet flow, a second packet flow from the server, associate the first packet flow and the second packet flow as a communication session between the client and the server, store the second packet flow in the data buffer. The processor will reevaluate the identification of the type of software application and protocol associated with the communication session using the list of applications and protocols and the static port mapping with the first packet flow and the second packet flow, select a second set of patterns based on the reevaluation of the identification of the software application and protocol, apply the second set of patterns to the first packet flow to re-determine whether the first packet flow represents a network attack, and forward the second packet flow to the client.

In yet another embodiment, a method comprises receiving, with a first network device, a first packet flow within a network, performing an initial identification of a type of software application and communication protocol associated with the first packet flow, applying a first set of patterns to the first packet flow to determine whether the first packet flow represents a network attack, and forwarding the first packet flow to a second network device. The method further comprises receiving, in response, a second packet flow from the second network device, associating the first packet flow and the second packet flow as a communication session between the first network device and the second network device. The method then comprises using the first packet flow and the second packet flow to reevaluate the initial identification of the type of software application and protocol associated with the communication session, selecting a second set of patterns based on the reevaluation of the initial identification of the software application and protocol, and applying the second set of patterns to each of the first packet flow and the second packet flow to re-determine whether the first packet flow or the second packet flow represent a network attack.

The techniques described herein may provide several advantages. For example, the techniques may help eliminate false positives and false negatives. A false positive may be the incorrect identification of a packet flow as malicious. A false negative may be failing to identify a malicious packet flow. Making an initial assessment based upon an inbound request, then reassessing the initial assessment may reduce or eliminate false positives and false negatives by verifying an original assumption in light of information from the outbound data stream. As another example, the techniques may identify malicious packet flows more quickly by identifying the type of application and protocol and tailoring signatures to fit the protocol(s) of that application.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
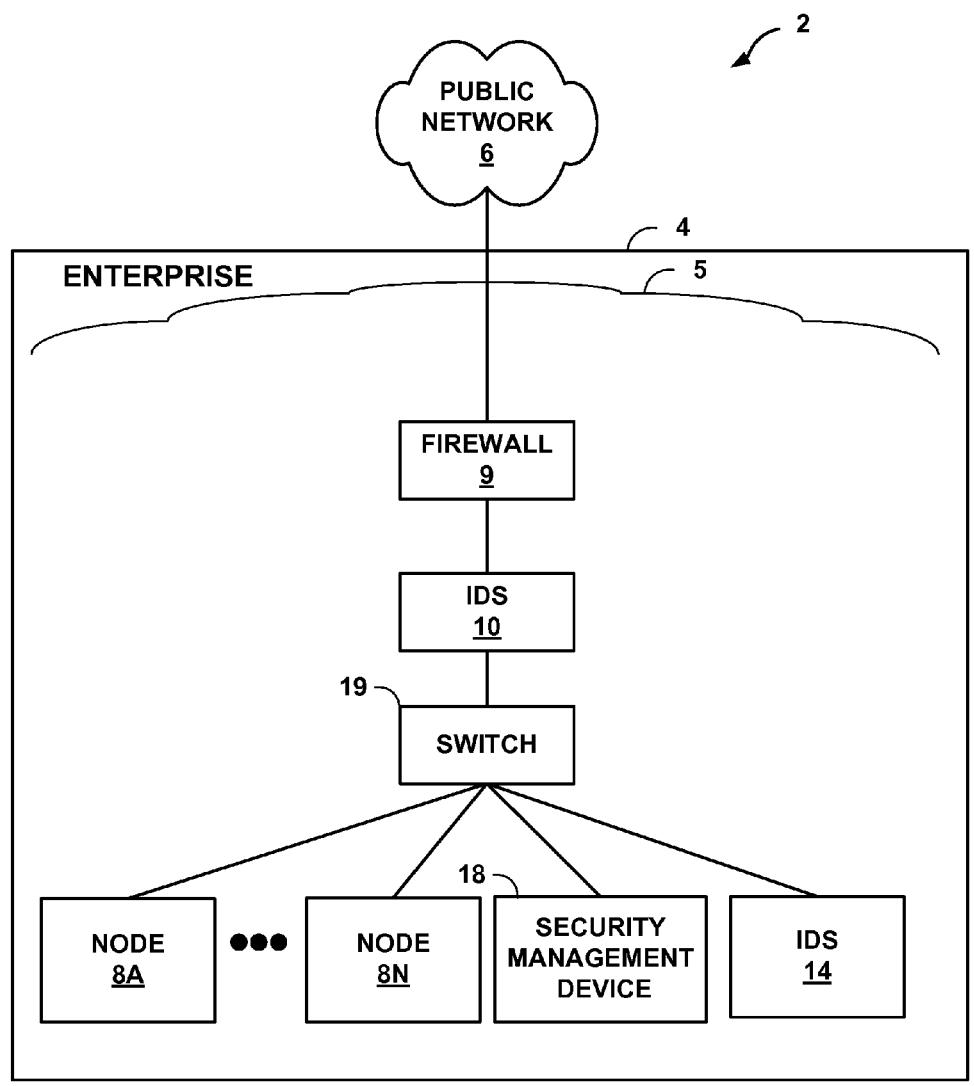
FIG. 1 is a block diagram illustrating an exemplary enterprise computer network in which an intrusion detection system ("IDS") identifies applications and protocols in accordance with the principles of the invention.

FIG. 1 is a block diagram illustrating an exemplary system 2 in which enterprise computer network 4 includes intrusion detection system ("IDS") 10 that identifies applications and protocols in accordance with the principles of the invention. In the example embodiment of FIG. 1, IDS 10 is a single network device. Network 4 also includes a private enterprise computing network 5 that is coupled to public network 6, such as the Internet. Public network 6 may include, for example, one or more client computing devices. Firewall 9 protects enterprise network 5 and, in particular, internal computing nodes 8A-8N. Computing nodes 8A-8N ("computing nodes 8") represent any private computing device within enterprise network 5, including workstations, file servers, print servers, database servers, printers and other devices.

In the example of FIG. 1, enterprise network 5 includes IDS 10 that monitors traffic flowing between firewall 9 and internal computing nodes 8. As described herein, IDS 10 may analyze network traffic flowing in both directions (i.e., inbound traffic received from public network 6 as well as outbound traffic destined to the public network) to improve the accuracy in detecting network attacks. That is, IDS 10 may analyze both client-to-server and server-to-client communications between public network 6 and computing nodes 8. IDS 10 may analyze the network traffic to correlate traffic in one direction with traffic in the opposite direction for each communication session detected within the network traffic. For example, for each client-server communication session, IDS may identify a packet flow in one direction (e.g., a client-to-server communication flow for a particular software application on the client) and a corresponding packet flow in the opposite direction (e.g., response communications flowing from the server to the client for that same software application).

In accordance with the principles of the invention, IDS 10 integrates pattern matching with application- and protocol-specific anomaly detection to identify sophisticated attack behaviors. In one embodiment, IDS 10 allows the system administrator to specify attack definitions. In one embodiment, the system administrator may specify compound attack definitions. Further details on application of attack definitions, e.g. compound attack definitions, may be found within U.S. patent application Ser. No. 11/045,572, Guruswamy et al., "Compound Attack Detection in a Computer Network," filed Jan. 27, 2005, assigned to the assignee of the current application, which is incorporated herein by reference in its entirety.

In general, the attack definitions may specify, for example, any combination of textual and non-textual (e.g., binary) patterns and protocol anomalies to define complex attack signatures. Moreover, IDS 10 may associate particular signatures with protocols of certain applications. For a given communication session intercepted by IDS 10, the IDS attempts to identify the application type and underlying protocol for the packet flows of the session in order to select one or more attack signatures to apply to the packet flows.

In general, IDS 10 identifies packet flows in the monitored traffic, and transparently reassembles application-layer communications from the packet flows. A set of protocol-specific decoders within the IDS 10 analyzes the application-layer communications and identifies application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In one embodiment, a transaction may be identified according to source and destination IP address, protocol, and source and destination port numbers. Other embodiments may identify a transaction in other ways, for example, by using media access control ("MAC") addresses.

For each transaction, the corresponding decoder analyzes the application-layer communications and extracts protocol-specific elements. For example, for an FTP login transaction, the FTP decoder may extract a pattern corresponding to a user name, a name for the target device, a name for the client device and other information.

In addition, the decoders analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules may, for example, be defined by published standards as well as vendor-defined specifications. Other anomalies refer to protocol events (i.e., actions) that technically comply with protocol rules but that may warrant a heightened level of scrutiny.

One example of such a protocol event is repeated failure of an FTP login request. Example anomalies for the HTTP protocol include missing HTTP version information, malformed universal resource locators ("URLs"), directory traversals, header overflow, authentication overflow and cookie overflow. Example anomalies for SMTP protocol include too many recipients, relay attempts, and domain names that exceed a defined length. Example anomalies for the POP3 protocol include user overflow and failed logins. Example anomalies for the FTP protocol include missing arguments, usernames or pathnames that exceed a defined length and failed logins. Other anomalies include abnormal and out-of-specification data transmissions, and commands directing devices to open network connections to devices other than the client devices issuing the commands.

IDS 10 applies the attack definitions to the elements and the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDS 10 may take one or more programmed actions, such as automatically dropping packet flows associated with the application-layer communications within which the network attack was detected.

In accordance with the techniques described herein, IDS 10 may attempt to identify the software application and protocol associated with each communication session, i.e., each corresponding pair of packet flows between a given client and server. IDS 10 uses the identified type of software application and underlying protocol type for the communication session to control selection of any protocol-specific patterns to be applied to the packet flows. IDS 10 may temporarily cache the initial assessment of the software application for later comparison and confirmation.

For example, upon first receiving a connection request from a client and destined for a server, IDS 10 may use a static port number list to make an initial assessment of the type of software application and protocol associated with the received packet flow. As one example, HTTP packets are typically directed to port 80, while e-mail packets have been directed to port 25. Therefore, IDS 10 may utilize the static port assignments to make an initial assessment for the type of software application and protocol associated with the received packet flow. Based on this initial assessment, IDS selects and applies a first set of patterns, i.e., attack definitions. This initial set may include protocol-specific attack definitions as well as default attack definitions.

In addition, IDS 10 monitors for traffic flowing in the opposite direction to intercept any response from the server. That is, IDS 10 identifies any response packet flow from the server, which typically utilizes the same or substantially similar network addresses, ports and/or protocol as the initial client request. Upon intercepting the response packet flow, IDS 10 performs an additional application identification test to confirm whether its initial assessment of the type of software application and protocol for the particular client-server communication session was correct. If not, IDS 10 may reclassify the communication as a different type of software application and protocol, and select and apply additional attack definitions based on the updated classification. That is, IDS 10 may retrieve the cached assessment of the application and then use the response packet flow to either confirm or modify the assessment, again caching the result.

Moreover, IDS 10 may apply the newly selected attack definitions to the first packet flow, e.g. the packet flow initially received from the client. That is, IDS 10 may include buffering capability to temporarily store the packet flow on which the initial assessment of application type was based, and apply any newly selected attack definitions to the buffered packet flow.

These techniques may allow IDS 10 to provide improved attack detection and prevention in environments where some applications no longer use a static port mapping but instead use dynamic or randomized port assignments in an attempt to evade detection and containment. For example, instant messaging programs may initiate communication on one port, but then agree to communicate thereafter on a distinct port. Other programs, such as peer-to-peer ("P2P") programs and hacker toolkits such as Metasploit, may determine ports dynamically as well. As described, IDS 10 may make an initial determination for the application type of a packet flow from a client device of public network 6 to a server device, e.g. node 8A, based upon characteristics of the communication in addition to specified port number. IDS 10 may then analyze the return communication from node 8A to the client device to verify the initial assumption or to modify the initial determination if necessary.

In some embodiments, enterprise network 5 may include multiple IDSs 10 and 14 located within different regions (e.g., sub-networks) of enterprise network 5. Security management device 18 may operate as a central device for managing IDSs 10 and 14. Although the example illustrated in FIG. 1 is described in terms of dedicated IDSs 10 and 14, the functionality described herein may be incorporated within other devices, such as firewall 9 or switch 19.

The example embodiment of IDS 10 portrayed by FIG. 1 may provide several advantages. For example, IDS 10 may reduce or eliminate false positives and false negatives. A false positive may be the incorrect identification of a packet flow as malicious. A false negative may be failing to identify a malicious packet flow. By making an initial assessment based upon an inbound request, then reassessing the initial assessment, IDS 10 help eliminate false positives and false negatives by verifying an original assumption in light of information from the outbound data stream. As another example, IDS 10 may identify malicious packet flows more quickly by identifying the type of application and protocol and tailoring signatures to fit the protocol(s) of that application.

Figure 2:
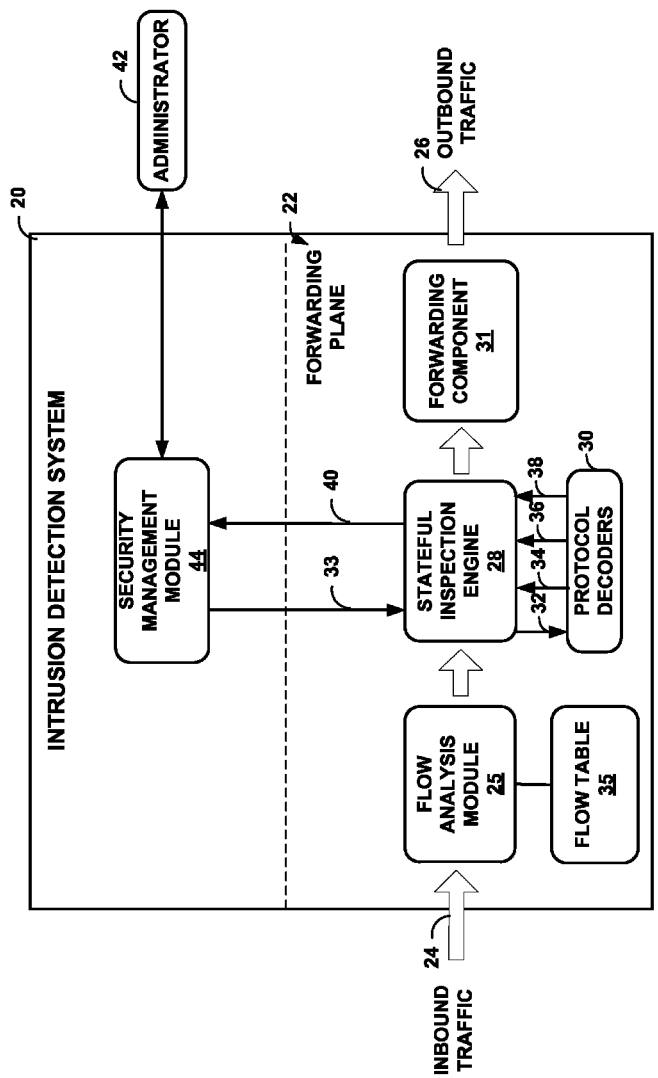
FIG. 2 is a block diagram illustrating an exemplary embodiment of an IDS in further detail.

FIG. 2 is a block diagram illustrating an example embodiment of an IDS 20. In the illustrated example, IDS 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, protocol decoders 30, forwarding component 31 and security management module 44.

Security management module 44 presents a user interface by which administrator 42 configures IDS 20. For example, administrator 42 may configure IDS 20 to monitor particular subnets of the enterprise network. In addition, security management module 44 presents a user interface by which administrator 42 may specify attack definitions 33, which security management module 44 relays to stateful inspection engine 28. In one embodiment, attack definitions 33 may be compound attack definitions. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow.

Flow analysis module 25 receives inbound traffic 24 and identifies network flows within the traffic. Each network flow represents a flow of packets in one direction within the network traffic and is identified by at least a source address, a destination address and a communication protocol. Flow analysis module 25 may utilize additional information to specify network flows, including source media access control ("MAC") address, destination MAC address, source port, and destination port. Other embodiments may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 may identify pairs of packet flows that collectively form a single communication session between a client and server. For example, flow table 35 may designate communication session as pairs of packet flows in opposite directions for flows sharing at least some common network addresses, ports and protocol.

As described in further detail below, stateful inspection engine 28 inspects both client-to-server packet flows as well as server-to-client packet flows in order to more accurately identify the type of application and underlying protocol for each communication session. This may assist when, for example, a malicious user attempts to spoof (i.e., mimic) one type of application and instead use another in attempt to bypass an IDS. As an example, a malicious user may attempt to circumvent an IDS by spoofing an SMTP request when actually using the HTTP protocol. IDS 20 may determine from the response from the server that the original packet flow was just an attempt to bypass IDS 20 and may take appropriate action, such as dropping future packets associated with the packet flow and/or alerting the targeted device of the attack.

IDS 20 may use a minimum data size of the reassembled TCP segments, in addition to the signature, in order to identify the types of applications. Certain applications may require a minimum amount of data, so IDS 20 may distinguish malicious packet flows by determining whether the packet flow contains enough data for the identified protocol. Moreover, IDS 20 may not necessarily recognize every application. In one embodiment, when an application is unknown, IDS 20 may simply forward the packet flow. If IDS 20 cannot identify a given application, it may be because that application is not a typical target for a malicious packet flow. Other embodiments may take other actions for unidentified applications, however, such as discarding all packets which target unknown applications or applying a default signature to all packet flows associated with unknown application types. Other embodiments may also utilize other protocols, such as the user datagram protocol (UDP); IDS 20 accordingly may require a minimum data size of UDP segments in order to identify the application associated with the UDP segments.

For each packet flow, stateful inspection engine 28 buffers a copy of the packet flow and reassembles the buffered packet flow to form application-layer communications 32. For example, stateful inspection engine 28 may reconstruct TCP segments into application-layer communications 32, which represent protocol-specific messages.

Stateful inspection engine 28 invokes the appropriate one of protocol decoders 30 based on the identified type of application determination to analyze the application-layer communications 32. Protocol decoders 30 represent a set of one or more protocol-specific software modules. Each of protocol decoders 30 corresponds to a different communication protocol or service. Examples of communication protocols that may be supported by protocol decoders 30 include the HyperText Transfer Protocol ("HTTP"), the File Transfer Protocol ("FTP"), the Network News Transfer Protocol ("NNTP"), the Simple Mail Transfer Protocol ("SMTP"), Telnet, Domain Name System ("DNS"), Gopher, Finger, the Post Office Protocol ("POP"), the Secure Socket Layer ("SSL") protocol, the Lightweight Directory Access Protocol ("LDAP"), Secure Shell ("SSH"), Server Message Block ("SMB") and other protocols.

Protocol decoders 30 analyze reassembled application-layer communications 32 and output transaction data 34 that identifies application-layer transactions. In particular, transaction data 34 indicate when a series of related application-layer communications between two peer devices starts and ends.

Stateful inspection engine 28 receives transaction data 34, application-layer elements 36 and protocol anomaly data 38 from protocol decoders 30. Stateful inspection engine 28 applies attack definitions 33 to protocol-specific application-layer elements 36 and anomaly data 38 to detect and prevent network attacks and other security risks.

In the event a security risk is detected, stateful inspection engine 28 outputs alert 40 to security management module 44 for logging and further analysis. In addition, stateful inspection engine 28 may take additional action, such as dropping the packets associated with the communication session, automatically closing the communication session or other action. If no security risk is detected for a given application-layer communication session, forwarding component 31 continues to forward the packet flows between the peers. Forwarding component 31 may, for example, maintain a routing table that stores routes in accordance with a topology of the enterprise network for use in forwarding the packet flows.

Figure 3:
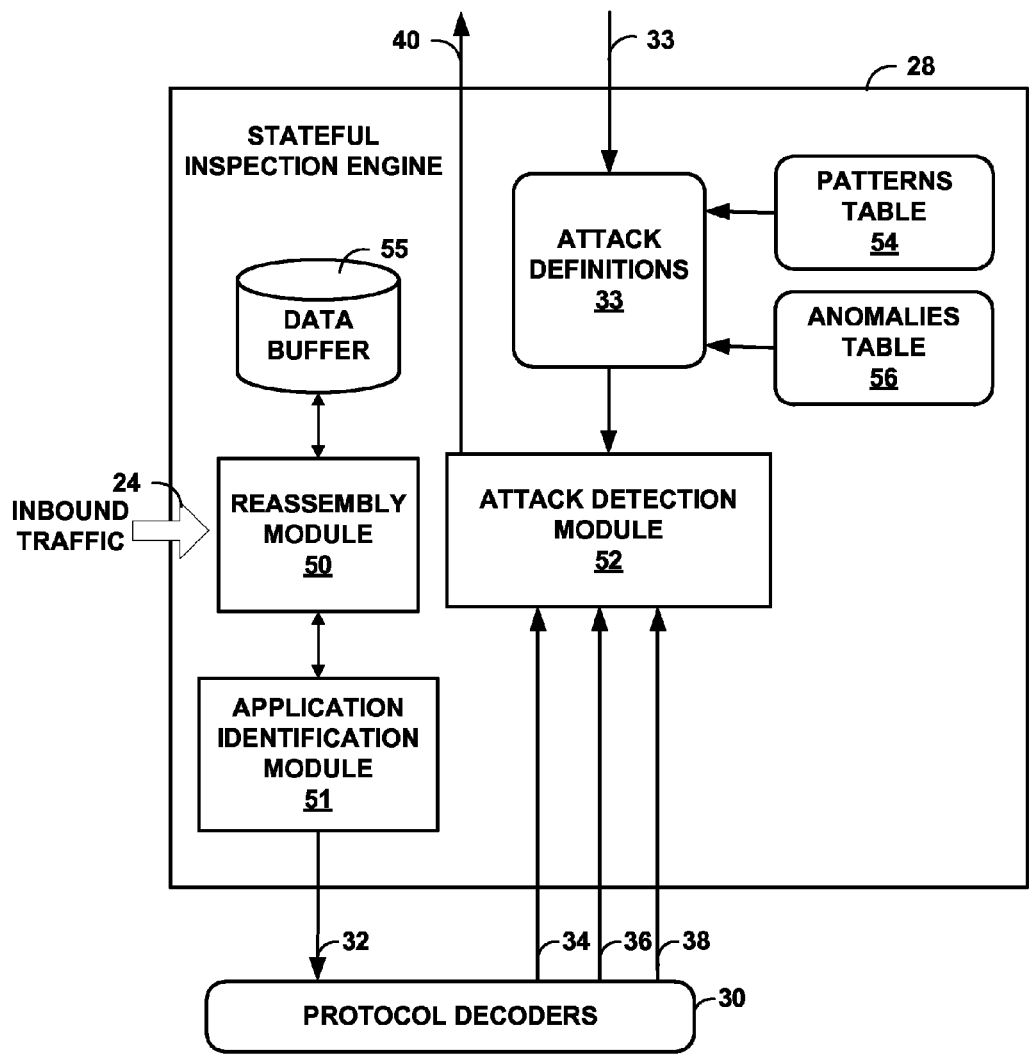
FIG. 3 is a block diagram that illustrates an example embodiment of a stateful inspection engine of the IDS.

FIG. 3 is a block diagram that illustrates an example embodiment of stateful inspection engine 28. In the example embodiment, stateful inspection engine 28 includes reassembly module 50, application identification module 51, and attack detection module 52. In addition, stateful inspection engine 28 includes patterns table 54, data buffer 55, anomalies table 56, and attack definitions 33.

Reassembly module 50 receives inbound network traffic 24 and reassembles application-layer communications 32 from the packet flows. Reassembly module 50 forwards the reassembled application-layer communications 32 to the appropriate protocol decoders 30 for processing.

Stateful inspection engine 28 stores attack definitions 33 received from security management module 44. Attack definitions 33 may be stored, for example, in a computer-readable medium, such as random access memory ("RAM"). Each of attack definitions 33 specifies a combination of one or more patterns specified within patterns table 54 and one or more protocol-specific anomalies specified within anomalies table 56.

Application identification module 51 identifies the type of application and underlying protocol for each intercepted communication session. When stateful inspection engine 28 receives a packet as part of a packet flow, reassembly module 50 buffers the packet in data buffer 55. In one embodiment, data buffer 55 may store data as a sliding window. That is, data buffer 55 may store data until becoming full or reaching a specified required amount of minimum data for identification. When full, data buffer 55 discards certain data to make room for storing new data. In one embodiment, data buffer 55 may store and discard data according to a first-in, first-out ("FIFO")-like protocol wherein the first data to be stored is the first data to be discarded when data buffer 55 becomes full. In another embodiment, data buffer 55 may discard data according to a least recently used protocol wherein, when data buffer 55 is full, the packet flow which has been least recently used will be discarded to make room for new data to be stored.

In one embodiment, reassembly module 50 may associate packets in a packet flow, and packet flows as a communication session, according to the 5-tuple {source IP address, destination IP address, protocol, source port, destination port}. Other embodiments may use other forms of associating packets. For example, in one embodiment, IDS 20 may be part of a network that utilizes virtual local area networks (VLANs). Accordingly, reassembly module 50 may associate packets in a packet flow according to a VLAN identifier, a source address, and a destination address. In any case, reassembly module 50 may utilize the information maintained within flow table 35 (FIG. 2) to reassemble network data, e.g., to form reassembled TCP data.

Application identification module 51 analyzes the reassembled data for the packet flow to identify the type of application and protocol associated with the packet flow. If application identification module 51 is unable to identify the type of application and protocol associated with the packet flow, application identification module 51 may use the well-known static port binding as a default application selection. Table 1, below, shows an example static port binding list. Other embodiments may use more, fewer, or different entries in a static port table. Moreover, administrator 42 may configure the static port mapping using security management module 44.

TABLE I

| PORT | APPLICATION |
|---|---|
| 20 | FTP |
| 22 | SSH |
| 23 | Telnet |
| 25 | SMTP |
| 43 | WHOIS |
| 53 | DNS |
| 67 | BOOTP or DHCP |
| 70 | Gopher |
| 79 | Finger |
| 80 | HTTP |
| 109 | POP |
| 110 | POP3 |
| 113 | ident/IRC |
| 118 | SQL |
| 119 | NNTP |
| 194 | IRC |
| 443 | HTTPS |
| 445 | SMB |
| 564 | RTSP |

In the case where application identification module 51 is unable to identify a type of application and protocol for a packet flow, application identification module 51 may use the default static port mapping to determine an application, causing IDS 20 to respond accordingly. In some cases, application identification module 51 may not be able to identify the application and the static port mapping may not have an entry for the requested port number. Various embodiments may treat this situation according to specifications of, for example, a system administrator. For example, in one embodiment, IDS 20 simply forwards packet flows with undetermined application types and protocols that cannot be determined by the static port mapping pass, as an unknown application may indicate that the packet flow is not targeting any type of application known to pose a security threat. In other embodiments, IDS 20 may automatically discard packet flows with unknown application types and protocols that cannot be determined by the static port mapping.

Application identification module 51 may include a hierarchically ordered list of similar application types. Application identification module 51 may store this list as a tree structure in a computer-readable medium. Security management module 44 may provide administrator 42 with a user interface to modify the contents and hierarchy of the list. Upon receiving a packet flow which may belong to one of several similar applications, application identification module 51 may make a preliminary best guess of the application and associated protocol by selecting the type of application designated as the highest ordered application in the list to which the packet flow corresponds. As application identification module 51 receives more information about the packet flow, application identification module 51 may alter the original determination accordingly. After determining an application, application identification module 51 may cache the determination for subsequent comparison.

For example, HTTP and FTP packet flows may share similar characteristics. However, attack detection module 52 may apply different signatures for each of HTTP and FTP. Application identification module 51 may maintain a list that designates HTTP as a higher priority (i.e., a higher security risk) than FTP. Therefore, upon receiving a packet flow that, upon initial classification, may be either HTTP or FTP, application identification module 51 may first select HTTP as the type of application based on the higher priority given to the type of protocol. Attack detection module 52 may then apply one or more signatures to the packet flow, including HTTP-specific signatures, according to the HTTP protocol assumption. Upon receiving a reply packet flow from the server, application identification module 51 may examine the reply packet flow and determine that the communication session shares more properties with an FTP communication session. Application identification module 51 may then re-classify the communication as an FTP communication session. Attack detection module 52 may then apply the FTP signatures to the previously received packet flow as stored within data buffer 55, including the initial packets of the packet flow, to re-determine whether the packet flow is malicious. Attack detection module 52 may examine packet flows in either or both directions. That is, attack detection module 52 may examine packet flows from client to server and from server to client to attempt to determine whether either or both packet flows include malicious data, such as viruses or other security risks.

To detect an attack or other malicious activity, attack detection module 52 applies attack definitions 33 to application-layer elements 36 and protocol anomaly data 38 received from protocol decoders 30. In particular, for each of attack definitions 33, attack detection module 52 selects the one or more patterns within patterns table 52 specified by the attack definition and determines whether any of application-layer elements 36 match the defined patterns. Each of the patterns may be defined as a respective "regular expression," which generally refers to a formula that is used to match patterns within data.

In addition to determining whether the defined patterns are present, attack detection module 52 may determine whether any protocol anomalies detected by protocol decoders 30 match the protocol anomalies specified by attack definitions 33. Attack detection module 52 determines that the corresponding packet flow matches one of attack definitions 33 when both the patterns and protocol anomalies specified by the compound attack definition are detected within a given communication session. Further, each of attack definitions 33 may specify whether the pattern matching and protocol anomalies must be satisfied on a per-transaction basis or over the lifetime of the communication session.

In the event a security risk is detected, stateful inspection engine 28 outputs alert 40 to security management module 44 (FIG. 2) for logging and further analysis. Stateful inspection engine 28 may also direct forwarding component 31 to automatically drop the packet flow associated with the application-layer communications within which the network attack was detected. In this manner, stateful inspection engine 28 combines pattern matching with protocol-specific anomaly analysis to detect sophisticated attack behaviors.

Figure 4:
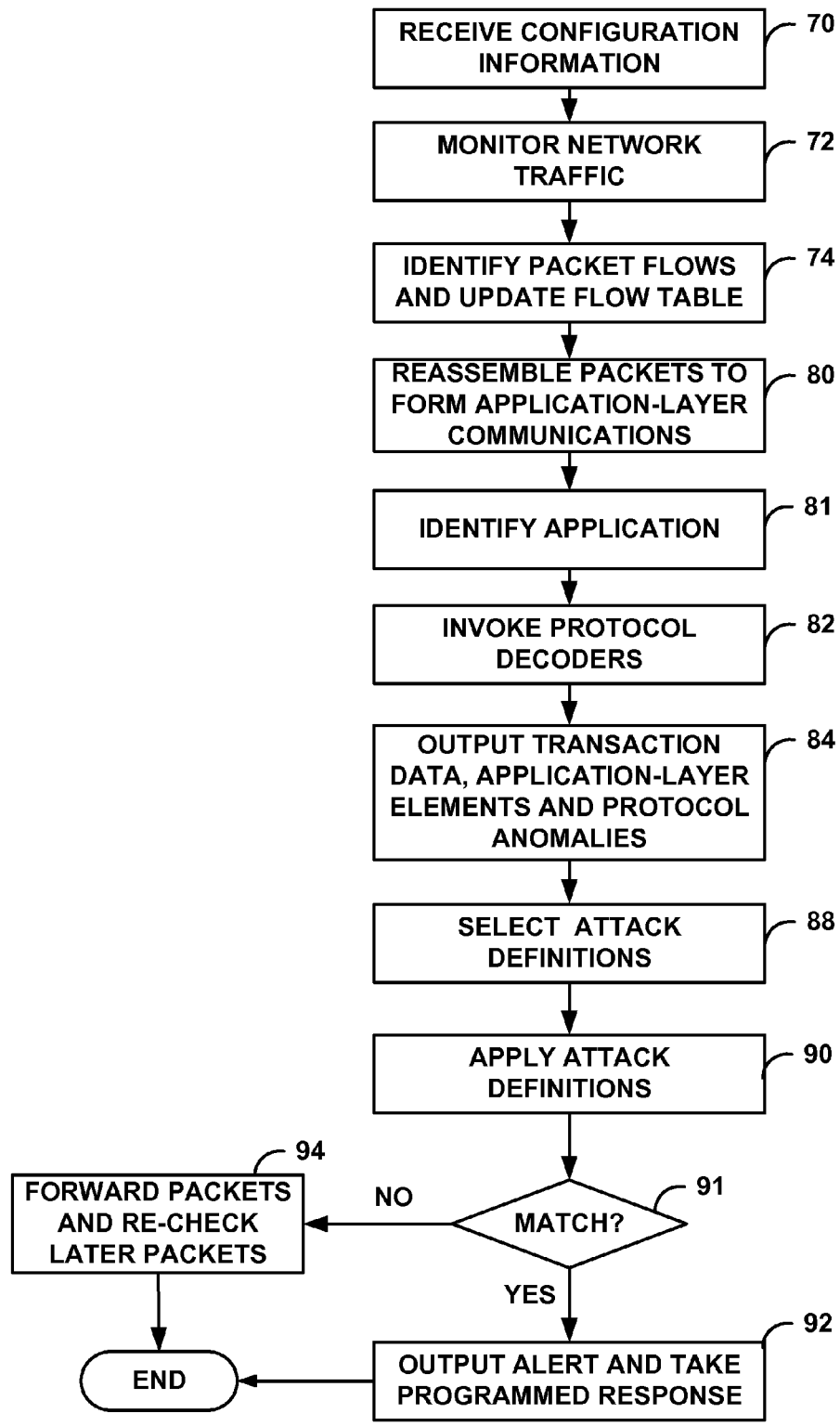
FIG. 4 is a flowchart illustrating exemplary operation of an IDS in accordance with the principles of the invention.

FIG. 4 is a flowchart illustrating exemplary operation of an IDS in accordance with the principles of the invention. For exemplary purposes, the flowchart is described in reference to IDS 20 (FIG. 2).

Initially, security management module 44 receives configuration information from administrator 42 and, in response, configures IDS 20 to monitor a network or portions thereof (subnets) of interest (70). During this process, configuration manager 44 may present a user interface by which administrator 42 specifies patterns or other attack definitions 33.

Once configured, IDS 20 monitors network traffic 24 (72). In some configurations, stateful inspection engine 28 of forwarding plane 22 may receive network traffic and mirror the network traffic for purposes of analysis. Forwarding component 31 seamlessly forwards the original network traffic. In other embodiments, traffic is not mirrored, rather a line-rate buffering approach is used to analyze the traffic in real-time prior to forwarding.

Flow analysis module 25 analyzes the network traffic to identify packet flows and updates flow table 35 to describe each active flow present within the network traffic (74). Stateful inspection engine 28 buffers each flow in data buffer 55, and reassembles the packet flow into transmission control protocol ("TCP") data (80). Stateful inspection engine 28 may wait until a sufficient, minimum amount of data is present before proceeding to application identification. As packets may arrive out of order, reassembly module 50 may wait until enough data have arrived to determine the beginning of the packet flow before performing analysis on the packet flow.

After identifying the beginning of the packet flow, application identification module 51 makes a preliminary determination of the type of application and protocol of the packet flow (81). This preliminary determination may be based on the pattern of the received packet flow, initial inspection of the payloads of the packets of the packet flow, the amount of data received in the packet flow or other characteristics.

Application identification module 51 may use a static port binding list to select a default type of application when application identification module 51 is unable to identify the type of application within a defined degree of confidence. In some configurations, application identification module 51 may use a function pointer to assist in identifying the application when an initial pattern applied to the packet flow does not reveal enough detail to select a type of application and protocol. That is, application identification module 51 may maintain a set of additional functions (i.e., software procedures) to inspect particular fields and perform certain functions on the data contained therein in order to identify the type of application. The function pointer may also perform an operation on one or more fields of payloads carried by the packet flow to produce an indicator of a network attack.

Application identification module 51 may invoke one or more of the functions by way of the predefined function pointers to provide a deeper level of analysis when determining the type of application and protocol for the communication session. Application identification module 51 then invokes the appropriate protocol decoders 30 to analyze the application-layer communications based on the application and protocol determination (82). That is, protocol decoders 30 analyze reassembled application-layer communications 32 and communicate transaction data 34, application-layer elements 36 and protocol anomaly data 38 to stateful inspection engine 28 (84).

Upon receiving data from protocol decoders 30, stateful inspection engine 28 selects the attack definitions 33 that are defined for the corresponding protocol, and optionally a set of default attack definitions when no particular type of application has been identified (88). Stateful inspection engine 28 then applies the selected compound attack definitions to determine whether the communication session represents a security risk (90). When applying a given compound attack definition, stateful inspection engine 28 determines whether all of the specified patterns and protocol anomalies are satisfied for any given communication session between peers, either on a per-transaction basis or over the lifetime of the communication session, as specified by the compound attack definition. Moreover, if required by the compound attack definition, stateful inspection engine 28 may determine whether the specified patterns and protocol anomalies are satisfied in a required order.

In the event a security risk (i.e., match) is detected (91), stateful inspection engine 28 outputs alert 40 to security management module 44 for logging and further analysis (92). In addition, stateful inspection engine 28 may take any of a number of programmed responses, such as dropping the packets associated with the communication session, automatically closing the communication session or other action. If no security risk is detected for a given application-layer communication session, forwarding component 31 forwards the packet flow to the destination (94). IDS 20 then waits for a response packet flow and reanalyzes the packet flow in light of the response to check the initial determination.

Figure 5:
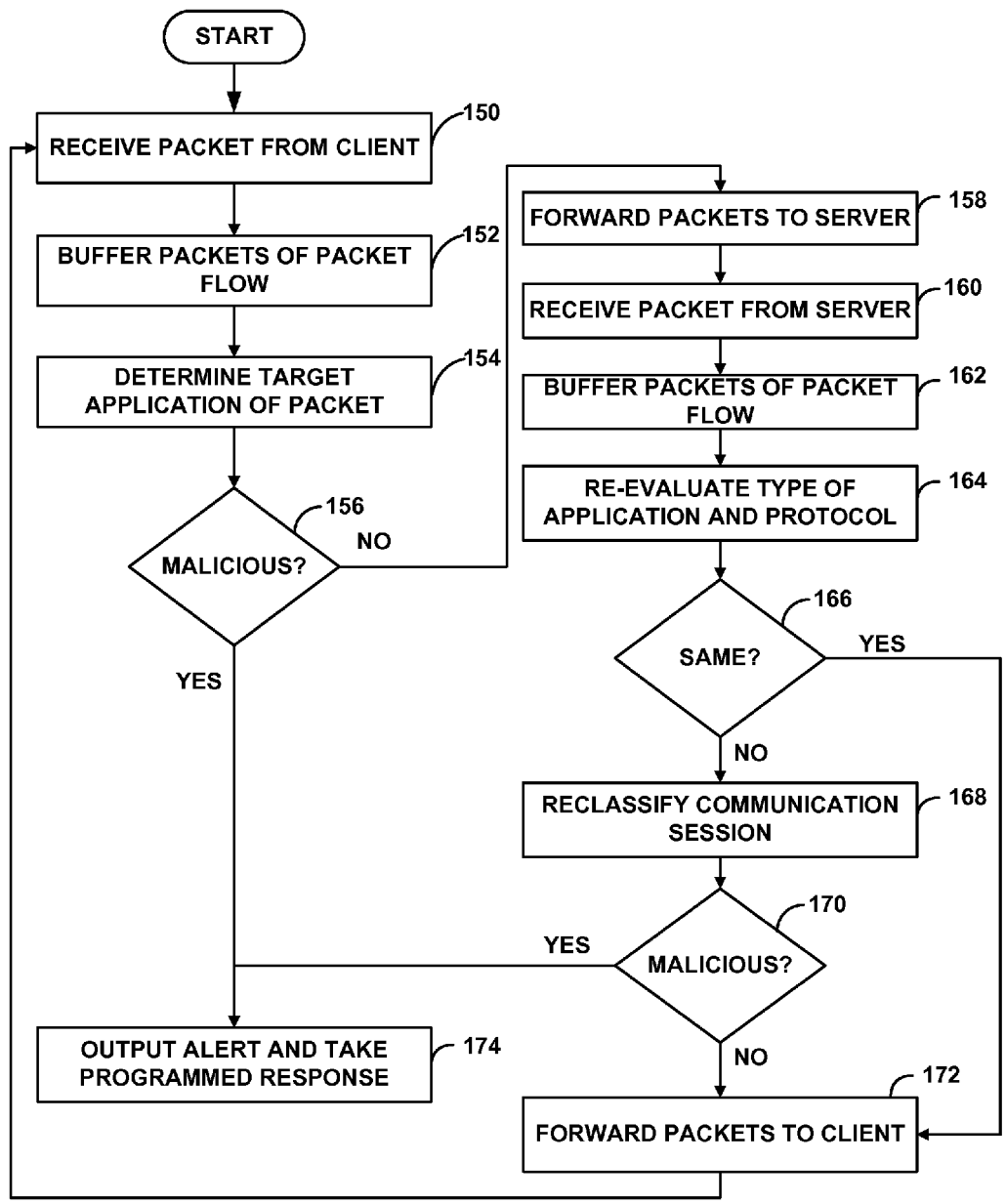
FIG. 5 is a flowchart illustrating the process by which an application identification module of an IDS performs an initial assessment of an application type and protocol and reassesses the application and protocol for a packet flow.

FIG. 5 is a flowchart illustrating the process by which application identification module 51 may determine and redetermine the type of application and protocol of a packet flow. Initially, stateful inspection engine 28 receives inbound packets of a packet flow from, for example, a client device of network 6 (150). The packet flow may be intended, for example, for a server such as node 8A. Reassembly module 50 first buffers the packet flow in data buffer 55 and reassembles the packet flow to form TCP data in accordance with the techniques described above (152). Application identification module 51 may be programmed to require a pre-defined minimum data size in addition to pattern matching to determine the type of application and underlying protocol. Application identification module 51 may also expect certain applications to require a certain amount of data, which may be the determined minimum data size, and may use this expectation in identifying the type of application and protocol or whether the type of application and protocol is known or unknown.

Once sufficient data has been gathered, application identification module 51 may make a preliminary determination as to the type of application and protocol associated with the packet flow (154). Application identification module 51 may analyze the pattern of the TCP data reassembled from packet flow to make the initial determination. For example, application identification module 51 may inspect the packet flow to find characteristics of known applications and the corresponding protocols, such as HTTP, FTP, sendmail, SMTP, etc. For applications which share similar characteristics, application identification module 51 may maintain data defining a hierarchy of applications. When a packet flow includes characteristics similar to a plurality of different applications, application identification module 51 may select the highest ordered application as the determined application and await a response packet flow from the server (e.g., node 8A) to either confirm or reevaluate the determination.

Application identification module 51 may use function pointers to invoke specific data processing functions to assist in determining the type of application. Function pointers may be used to analyze the packet flow in greater detail. Specifically, when the patterns in the packet flow are not unique enough to determine the particular type of application, application identification module 51 may call function pointers to extract extra details from the packet flow. For example, application identification module 51 may attempt to identify particular values for particular locations within the data within the packet flow. Function pointers may be used to extract and compare such data. The function pointers may be used to invoke certain functions one or more times. For example, function pointers may be used to determine whether a particular number, a particular text value, a text string matching a pattern, a particular Boolean value, or other type of data or particular value(s) are present within the packet flow. As an example, hacker tools, such as "BackOrifice" or "Skype," may require small verification programs to properly identify. The function pointer may invoke an appropriate verification program to identify these or other applications.

After making an initial determination as to the type of application and the underlying communication protocol, application identification module 51 invokes protocol decoders 30 and attack detection module 52 to decode the packet flow and determine whether the packet flow represents a network attack or other malicious behavior (156). In one embodiment, if application identification module 51 cannot identify the type of application and/or protocol, stateful inspection engine 28 declares that the packet flow is not malicious. If the packet flow is malicious ("YES" branch of 156), stateful inspection engine 28 reacts accordingly by, for example, discarding the packet flow and/or alerting the target device of the attack (174). Stateful inspection engine 28 may also record data identifying the source of the attack, such as the IP address and/or MAC address of the attacker, in case the attacker attempts to send more malicious data.

If the packet flow is determined not to be malicious ("NO" branch of 156), stateful inspection engine 28 delivers the packet flow to the intended destination, e.g. node 8A (158).

After processing the packet flow, node 8A may send a response to the client through IDS 20, received by stateful inspection engine 28 (160). That is, node 8A, in this example, may output a response packet flow for the communication session requested by the client. IDS 20 detects the response packet flow and associates the response with the initial request, thereby defining a bidirectional communication session.

Reassembly module 50 buffers the response packet flow in data buffer 55 (162) and reassembles the data into TCP data for further analysis. IDS 20 may analyze traffic in each direction to determine whether an attack is present.

Application identification module 51 may then reevaluate the type of application and protocol of the packet flow in accordance with the received response (166). If the initial determination matches the new determination ("YES" branch of 166), stateful inspection engine 28 will continue to forward the packet flow. If the initial determination was incorrect however ("NO" branch of 166), application identification module 51 may reclassify the packet flow (168). Application identification module 51 may, for example, choose the next highest ordered application from the list of applications with similar characteristics. Application identification module 51 may also use a static port mapping to identify the type of application and protocol if, for example, there are no lower ordered entries in the list of applications.

As an example, if HTTP was first and FTP was second in the hierarchy, the initial determination was HTTP, and the new determination is that the packet flow was not HTTP, application identification module 51 may select FTP as the new determination of the type of application and protocol. If application identification module 51 can find no more corresponding applications in the list, application identification module 51 may classify the type of application and of the packet flow as unknown. Application identification module 51 may also use a static port binding list, such as Table 1 above, to make a determination of a type of application and protocol.

Because a significant recent portion of the packet flow can be buffered in data buffer 55, application identification module 51 may essentially replay the buffered TCP data and re-invoke protocol decoders 30 in accordance with the new determination for the application type. Attack determination module 52 then determines whether the packet flow, including the initial packets received from the client, indicate that the communication session represents an attack or other malicious behavior (170). If not ("NO" branch of 170), stateful inspection engine 28 may continue to forward the packet flows of the communication session between the client and the server (172), possibly waiting for more packets to yet again reevaluate the identified type of application. If the communication session is deemed malicious ("YES" branch of 170), stateful inspection engine 28 may react accordingly by, for example, discarding packets associated with the packet flows and/or alerting the target server of the attack (174).

Figure 6:
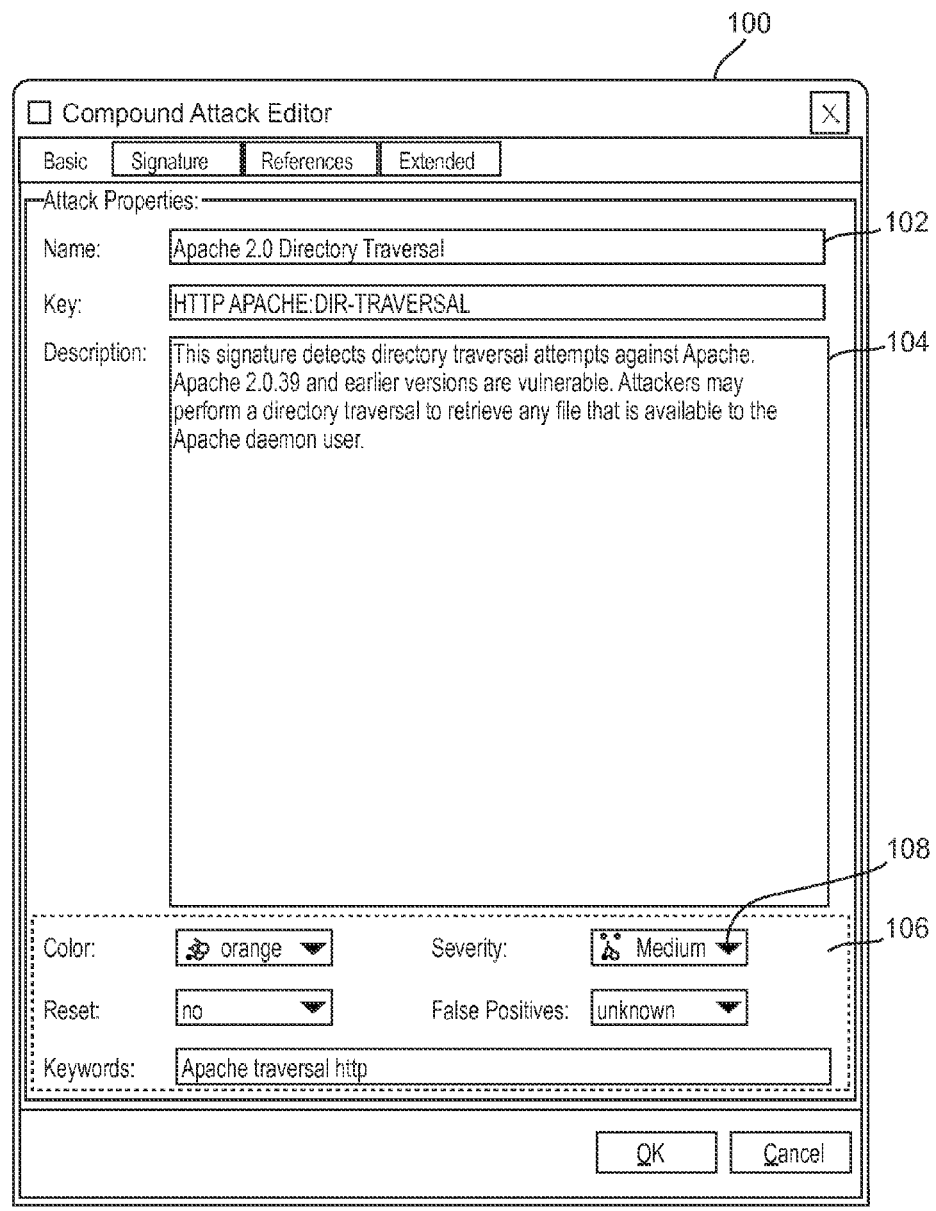
FIGS. 6 and 7 are example user interfaces presented by the IDS.

FIG. 6 is an example user interface 100 presented by an IDS with which an administrator interacts to create a pattern for detecting attacks. In this example, user interface 100 allows the administrator to define a compound network attack definition. As illustrated in FIG. 6, user interface 100 includes an input 102 by which the administrator may provide a name for the compound network attack. In addition, interface 100 includes an input 104 by which the administrator may provide a brief description for the compound network attack. The example of FIG. 6 illustrates a compound network attack for detecting directory traversal attempts against an Apache web server.

In addition, interface 100 includes inputs 106 by which the administrator may provide other data for the compound network attack, such as a severity level 108, keywords for use in indexing and analysis, and other data.

Figure 7:
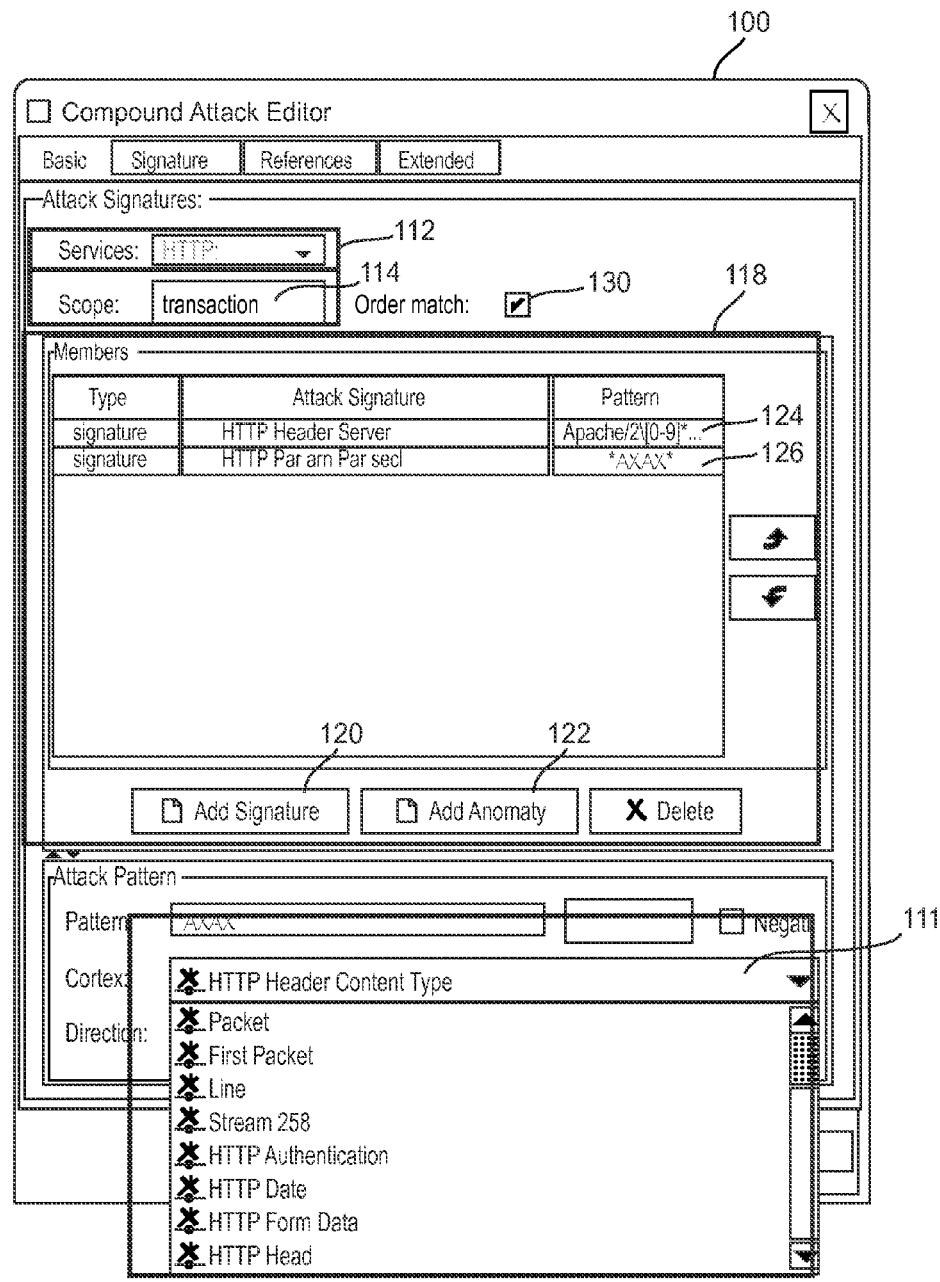

FIG. 7 is an example of user interface 110 presented when the user selects the "Signatures" tab of user interface 100 (FIG. 6). As illustrated, user interface 110 includes an input 112 with which the administrator specifies a protocol to which the compound attack definition pertains. In this example, the administrator has selected HTTP as this exemplary compound network attack definition relates to an Apache web server.

User interface 110 further includes an input 111 by which the administrator selects from a list of contexts for the particular protocol selected in input 112. For example, input 111 provides a drop-down menu by which the administrator selects HTTP contexts, such as HTTP Authorization, HTTP data, HTTP form data and other contexts available from the headers in an HTTP communication.

User interface 110 further includes an input 114 by which the administrator selects a scope for the compound attack definition is to be applied. In particular, input 114 allows the administrator to specify whether the attack is session based (i.e., to be applied over the lifetime of a session and across all transactions associated with the session) or transaction based (i.e., applied on a per transaction basis and cleared at the end of each transaction).

User interface 110 further includes an input area 118 by which the administrator defines the constituent members of the compound attack definition. In particular, the administrator may add patterns by selecting Add button 120 or protocol anomalies by selecting Add button 122. Input area 118 lists the members currently defined for the compound attack definition. In this example, two patterns 124, 126 have been defined in the form of regular expressions.

User interface 110 also includes an input 130 by which the administrator controls whether the constituent members must be detected in the order presented within input area 118 or whether the members may be detected in any order within the scope defined by input area 114.

Although described primarily with respect to determining whether a packet flow from a client to a server is malicious, the techniques described herein may readily be adapted to other embodiments and implementations. For example, an IDS may be positioned between any two network devices. The IDS may analyze packet flows between either or both of the network devices. For example, in one embodiment, an IDS may determine that a compromised server has attempted to transmit data to a client device in order to infect the client device with a computer virus. In some embodiments, the first packet flow may originate from the server and the second packet flow may originate from the client. In still other embodiments, two network devices may be peer devices and an IDS may be positioned between the two devices in order to detect and/or prevent malicious data originating from either or both of the peer devices.

Various embodiments of the invention have been described. Although the embodiments have been described in terms of packet-based systems and methods, any network and application-layer profiling data may be correlated for other types of networks without departing from the principles of the invention. These and other embodiments are within the scope of the following claims.

The invention claimed is:

1. A method comprising:
   reassembling transmission control protocol (TCP) data of a plurality of packets of a first packet flow within a network from a client to a server to produce reassembled data for the first packet flow;
   performing an initial identification of a type of software application executed by a client to determine a first type of software application for the software application executed by the client, wherein the software application generates the first packet flow, and wherein performing the initial identification comprises:
   applying a plurality of application patterns to the reassembled data for the first packet flow, wherein the application patterns define characteristics of packet flows generated or received by respective types of software applications; and
   when one of the application patterns corresponding to the first type of software application matches the reassembled data for the first packet flow, selecting the first type of software application as the initial identification of the type of software application;
   selecting a first set of attack patterns associated with the first type of software application, wherein the first set of attack patterns defines characteristics of packet flows generated by the first type of software application when the first type of software application is performing a network attack;
   prior to receiving a second packet flow from the server to the client in response to the first packet flow from the client to the server, wherein the first packet flow and the second packet flow form a communication session between the client and the server, applying the first set of attack patterns to the first packet flow to determine whether the first packet flow from the client to the server represents a network attack;

after receiving the second packet flow from the server to the client, reassembling TCP data of a plurality of packets of the second packet flow to produce reassembled data for the second packet flow;

using the reassembled data for the second packet flow to determine an updated identification of the type of software application executed by the client to determine a second type of software application for the software application executed by the client, wherein the second type of application is different than the first type of application, and wherein using the reassembled data for the second packet flow to determine the updated identification comprises:

applying one or more of the application patterns to the reassembled data for the second packet flow; and when one of the application patterns corresponding to the second type of software application matches the reassembled data for the second packet flow, selecting the second type of software application as the updated identification of the type of software application;

selecting a second set of attack patterns associated with the second type of application, wherein the second set of attack patterns is different than the first set of attack patterns, and wherein the second set of attack patterns defines characteristics of packet flows generated by the second type of software application when the second type of software application is performing a network attack; and applying the second set of attack patterns to the first packet flow from the client to the server to determine whether the first packet flow from the client to the server represents a network attack.

2. The method of claim 1, wherein performing the initial identification comprises:

creating a hierarchical list of applications and associated protocols;

comparing properties of the first packet flow with members of the list; and selecting a highest ordered member of the list with which the first packet flow shares properties as a currently selected type of application.

3. The method of claim 2, wherein determining the updated identification comprises:

comparing properties of the second packet flow with members of the list; and when the properties of the second packet flow do not match the currently selected type of application, selecting a next highest ordered member of the list as the currently selected type of application.

4. The method of claim 2, wherein the compared properties comprise at least one of a packet flow pattern, a destination port number, a source port number, and a protocol.

5. The method of claim 1, wherein the identified type of application uses a protocol which is at least one of Hyper-Text Transfer Protocol (HTTP), File Transfer Protocol (FTP), Network News Transfer Protocol (NNTP), Telnet, Domain Name System (DNS), Gopher, Finger, Post Office Protocol (POP), POP3, Secure Socket Layer (SSL) protocol, Lightweight Directory Access Protocol (LDAP), Secure Shell (SSH), Server Message Block (SMB) or Simple Mail Transfer Protocol (SMTP).

6. The method of claim 1, further comprising buffering the first packet flow to store at least a connection request by the client, wherein using the second packet flow to determine the updated identification comprises, after forwarding the first packet flow to the server and receiving, in response, the second packet flow from the server, applying the second set of patterns to the buffered connection request of the first packet flow to determine whether the first packet flow represents a network attack.

7. The method of claim 6, wherein buffering the first packet flow comprises:

storing a packet from the client as part of the first packet flow;

determining a source Internet protocol ("IP") IP address, a destination IP address, a protocol, a source port, and a destination port of the packet; and storing one or more subsequent packets from the client with corresponding source IP address, destination IP address, protocol, source port, and destination port as part of the first packet flow as the packet.

8. The method of claim 1, wherein performing an initial identification comprises attempting to identify the type of application after receiving a predefined minimum number of data packets of the first packet flow prior to forwarding the data packets to the server.

9. The method of claim 1, further comprising forwarding the second packet flow to the client after applying the second set of patterns and confirming that the first packet flow does not represent a network attack.

10. The method of claim 1, wherein when none of the plurality of application patterns matches the reassembled data for the first packet flow, performing the initial identification comprises identifying the type of software application according to at least one of a source port and a destination port of the first packet flow using a default static port mapping that maps port numbers to corresponding applications.

11. The method of claim 1, wherein performing the initial identification comprises inspecting, with a function pointer, one or more fields of packets of the first packet flow.

12. The method of claim 11, wherein the function pointer invokes a function on one or more fields of payloads carried by packets of the first packet flow to determine whether a particular number, a particular text value, a text string matching a pattern, or a particular Boolean value is present within the packet flow at a particular position.

13. The method of claim 1, wherein performing the initial identification comprises:

accessing configuration data to determine a minimum data size; and performing the initial identification only after receiving a quantity of data from the first packet flow at or exceeding the minimum data size.

14. An intrusion detection system ("IDS") device with memory comprising:

a reassembly module configured to reassemble transmission control protocol (TCP) data of pluralities of packets of packet flows within a network between a client and a server to produce reassembled data for the packet flows;

an application identification module configured to perform an initial identification of a type of software application executed by the client to determine a first type of software application for the software application executed by the client, wherein the software application generates a first packet flow from the client to the server, and wherein the application identification module is configured to determine an updated identification of the type of software application associated with the first packet flow from the client to the server using a second packet flow from the server to the client, wherein the first packet flow and the second packet flow form a communication session between the client and the server, wherein to perform the initial identification, the application identification module is configured to apply a plurality of application patterns to reassembled data for the first packet flow, wherein the application patterns define characteristics of packet flows generated or received by respective types of software applications, and wherein to determine the updated identification, the application identification module is configured to apply one or more of the application patterns to reassembled data for the second packet flow, and when one of the application patterns corresponding to the second type of software application matches the reassembled data for the second packet flow, selecting the second type of software application as the updated identification of the type of software application; and a stateful inspection engine configured to select a first set of attack patterns associated with the first type of software application, wherein the first set of attack patterns defines characteristics of packet flows generated by the first type of software application when the first type of software application is performing a network attack, apply, prior to receiving the second packet flow from the server to the client in response to the first packet flow from the client to the server, the first set of attack patterns to the first packet flow from the client to the server to determine whether the first packet flow from the client to the server represents a network attack, and after determining the updated identification of the type of software application, select a second set of attack patterns that is different than the first set of attack patterns and that is associated with the second type of software application, wherein the second set of attack patterns defines characteristics of packet flows generated by the second type of software application when the second type of software application is performing a network attack, and wherein the stateful inspection engine is configured to apply the second set of patterns; to the first packet flow from the client to the server to determine whether the first packet flow from the client to the server represents a network attack.

15. The IDS device of claim 14, further comprising a flow table to associate the first packet flow and the second packet flow as a communication session between the client and the server.

16. The IDS device of claim 15, wherein the flow table utilizes source and destination internet protocol ("IP") addresses, protocol, and source and destination port numbers of packets from each of the first packet flow and second packet flow to associate the first packet flow and the second packet flow as the communication session.

17. The IDS device of claim 14, further comprising:
a forwarding component configured to forward the first packet flow to the server and the second packet flow to the client; and
a data buffer to store packets from each of the first packet flow and the second packet flow,
wherein the application identification module is configured to perform the initial identification of the type of software application and communication protocol associated with the first packet flow before the forwarding component forwards the first packet flow, and
wherein the application identification module is configured to extract the first packet flow from the data buffer and to perform a second identification of the type of software application and communication protocol associated with the first packet flow after the flow analysis module receives the second packet flow.

18. The IDS device of claim 14, wherein the application identification module comprises a hierarchically ordered list of applications and associated protocols to permit the application identification module to select a highest ordered member of the list with which the first packet flow shares properties as a currently selected type of application and, when properties of the second packet flow do not match the currently selected type of application, to select a next highest ordered member of the list as the currently selected type of application.

19. The IDS device of claim 18, wherein the hierarchically ordered list of protocols comprises at least one of HyperText Transfer Protocol (HTTP), File Transfer Protocol (FTP), Network News Transfer Protocol (NNTP), Telnet, Domain Name System (DNS), Gopher, Finger, Post Office Protocol (POP), POP3, Secure Socket Layer (SSL) protocol, Lightweight Directory Access Protocol (LDAP), Secure Shell (SSH), Server Message Block (SMB) or Simple Mail Transfer Protocol (SMTP).

20. The IDS device of claim 14, wherein the application identification module comprises a static port mapping list to associate port numbers with types of applications and protocols, wherein the application identification module is configured to select a type of application for the first packet flow and second packet flow when the application identification module cannot identify the type of application by other means.

21. The IDS device of claim 14, wherein the application identification module comprises a function pointer to inspect one or more fields of packets of the first packet flow and the second packet flow and to produce an indicator of a network attack.

22. The IDS device of claim 14, further comprising a forwarding component configured to forward the first packet flow to the server and the second packet flow to the client, wherein the forwarding component is configured to access configuration data to determine a minimum data size and to forward the first packet flow only after receiving a quantity of data from the first packet flow at or exceeding the minimum data size.

23. A non-transitory computer-readable medium comprising instructions that, when executed, cause a processor to:
reassemble transmission control protocol (TCP) data of a plurality of packets of a first packet flow within a network from a client to a server to produce reassembled data for the first packet flow;
perform an initial identification of a type of software application executed by a client to determine a first type of software application for the software application executed by the client, wherein the software application generates the first packet flow, and wherein the instructions that cause the processor to perform the initial identification comprise instructions that cause the processor to:
apply a plurality of application patterns to the reassembled data for the first packet flow, wherein the application patterns define characteristics of packet flows generated or received by respective types of software applications; and when one of the application patterns corresponding to the first type of software application matches the reassembled data for the first packet flow, select the first type of software application as the initial identification of the type of software application;

select a first set of attack patterns associated with the first type of software application, wherein the first set of attack patterns defines characteristics of packet flows generated by the first type of software application when the first type of software application is performing a network attack;

prior to receiving a second packet flow from the server to the client in response to the first packet flow from the client to the server, wherein the first packet flow and the second packet flow form a communication session between the client and the server, apply the first set of attack patterns to the first packet flow to determine whether the first packet flow from the client to the server represents a network attack;

after receiving the second packet flow from the client to the server, reassemble TCP data of a plurality of packets of the second packet flow to produce reassembled data for the second packet flow;

use the reassembled data for the second packet flow to determine an updated identification of the type of software application executed by the client to determine a second type of software application for the software application executed by the client, wherein the second type of application is different than the first type of application, and wherein the instructions that cause the processor to use the reassembled data for the second packet flow to determine the updated identification comprise instructions that cause the processor to:

apply one or more of the application patterns to the reassembled data for the second packet flow; and when one of the application patterns corresponding to the second type of software application matches the reassembled data for the second packet flow, select the second type of software application as the updated identification of the type of software application;

select a second set of attack patterns associated with the second type of application, wherein the second set of attack patterns is different than the first set of attack patterns, and wherein the second set of attack patterns defines characteristics of packet flows generated by the second type of software application when the second type of software application is performing a network attack; and apply the second set of attack patterns to the first packet flow from the client to the server to determine whether the first packet flow from the client to the server represents a network attack.

24. The non-transitory computer-readable medium of claim 23, further comprising instructions that cause the processor to:

inspect, with a function pointer, one or more fields of packets of the first packet flow and second packet flow; and perform, with the function pointer, an operation on one or more fields of payloads carried by packets of the first packet flow or the second packet flow to produce an indicator of the network attack.

* * * * *